(12) United States Patent
Mohseni et al.

(10) Patent No.: US 9,556,371 B2
(45) Date of Patent: Jan. 31, 2017

(54) HOMOGENEOUS BLENDING

(75) Inventors: Saeed H. Mohseni, Sylvania, OH (US); Elizabeth K. Gramm, Clayton, MI (US); Deepak Mahulikar, Madison, CT (US)

(73) Assignee: Fujifilm Planar Solutions, LLC, Mesa, AZ (US)

( * ) Notice: Subject to any disclaimer, the term of this patent is extended or adjusted under 35 U.S.C. 154(b) by 828 days.

(21) Appl. No.: 13/618,088

(22) Filed: Sep. 14, 2012

(65) Prior Publication Data

US 2013/0067998 A1 Mar. 21, 2013

Related U.S. Application Data

(60) Provisional application No. 61/535,293, filed on Sep. 15, 2011.

(51) Int. Cl.
*B01J 13/00* (2006.01)
*C09G 1/02* (2006.01)
*C09K 3/14* (2006.01)

(52) U.S. Cl.
CPC ............ *C09K 3/1463* (2013.01); *C09G 1/02* (2013.01)

(58) Field of Classification Search
CPC ................................. C09K 3/1463; C09G 1/02
USPC ........... 516/77, 81, 89, 93, 928; 51/308, 309
See application file for complete search history.

(56) References Cited

U.S. PATENT DOCUMENTS

| | | | | |
|---|---|---|---|---|
| 4,643,584 A * | 2/1987 | Allocca | ......................... | 366/337 |
| 5,165,996 A * | 11/1992 | Jacobson | .......... | C04B 35/62813 |
| | | | | 428/404 |
| 5,853,616 A * | 12/1998 | Moffett et al. | ................ | 516/110 |
| 5,980,836 A * | 11/1999 | Moffett et al. | ................ | 422/129 |
| 6,602,439 B1 | 8/2003 | Hampden-Smith et al. | | |
| 6,923,568 B2 * | 8/2005 | Wilmer et al. | ............ | 366/152.1 |
| 7,905,653 B2 * | 3/2011 | Wilmer et al. | ................ | 366/132 |
| 8,192,644 B2 * | 6/2012 | Kim et al. | .................... | 252/79.1 |
| 8,303,806 B2 * | 11/2012 | Mohseni et al. | ................ | 210/85 |

(Continued)

FOREIGN PATENT DOCUMENTS

| KR | 10-2009-0026984 | 3/2009 |
|---|---|---|
| WO | WO 2010/091388 A1 * | 8/2010 |

OTHER PUBLICATIONS

Iler, Ralph K. (1979), Chemistry of Silica—Solubility, Polymerization, Colloid and Surface Properties and Biochemistry, John Wiley & Sons, NY, NY, USA, pp. 143-144.*

(Continued)

*Primary Examiner* — Daniel S Metzmaier
(74) *Attorney, Agent, or Firm* — Fish & Richardson P.C.

(57) ABSTRACT

A method of forming a colloidal dispersion includes providing a first continuous material flow, providing a second continuous material flow, combining the first and second continuous material flows, and moving a continuous flow of a colloidal dispersion in a direction downstream of the first and second continuous flows. The first continuous material flow includes one or more of a diluent (e.g., deionized water), a base, and an acid, and the second continuous material flow includes an abrasive particle solution. The first and second material flows are combined with a Reynolds number greater than about 4400 and less than about 25000 (e.g., about 7400 to about 25000). The colloidal dispersion includes the diluent, the base, the acid, and abrasive particles from the abrasive particle solution.

30 Claims, 14 Drawing Sheets

(56) References Cited

U.S. PATENT DOCUMENTS

| | | | | |
|---|---|---|---|---|
| 8,876,926 | B2* | 11/2014 | Criniere et al. | 51/307 |
| 2004/0057334 | A1 | 3/2004 | Wilmer et al. | |
| 2010/0320127 | A1* | 12/2010 | Mohseni et al. | 210/85 |
| 2011/0027997 | A1 | 2/2011 | Shinoda et al. | |
| 2012/0055865 | A1* | 3/2012 | Mohseni et al. | 210/348 |
| 2014/0238441 | A1* | 8/2014 | Mohseni et al. | 134/10 |

OTHER PUBLICATIONS

G. A. Parks, "The Isoelectric Points of Solid Oxides, Solid Hydroxides, and Aqueous Hydroxo Complex Systems," Chem. Rev., 65 [2] 177-98 (1965).*

Marek Kosmulski, "Chemical Properties of Material Surfaces", Marcel Dekker, (2001), Appendix 3, pp. 731-744.*

Notification of Transmittal of International Search Report and Written Opinion issued in PCT/US2012/053781 on Dec. 10, 2012.

* cited by examiner

HOMOGENEOUS BLENDING

CROSS-REFERENCE TO RELATED APPLICATION

This application claims priority from U.S. Provisional Patent Application No. 61/535,293, filed Sep. 15, 2011, the contents of which are hereby incorporated by reference in its entirety.

TECHNICAL FIELD

This disclosure relates to homogeneous blending systems and related components and methods.

BACKGROUND

Mixing is a process in which two or more substances are combined while the chemical properties of each substance remain unchanged. The properties of the overall mixture, however, can differ from those of the component substances. Thus, mixing is often used to produce a medium with a desired set of physical and chemical properties.

For example, in semiconductor fabrication, chemical mechanical planarization (CMP) is used to make wafer surfaces flat. This process requires a slurry of abrasive particles dispersed in a chemically corrosive agent. The slurry is sometimes referred to as a colloidal dispersion. During CMP, movement of the abrasive particles on the wafer mechanically removes material from the wafer surface. The chemically corrosive agent of the slurry facilitates this mechanical removal of material by reacting with the material to be removed.

SUMMARY

In one aspect, a method of forming a colloidal dispersion includes providing a first continuous material flow, providing a second continuous material flow, combining the first and second continuous material flows, and moving a continuous flow of a colloidal dispersion in a direction downstream of the first and second continuous flows. The first continuous material flow includes one or more of a diluent (e.g., deionized water), a base, and an acid, and the second continuous material flow includes an abrasive particle solution. The first and second material flows are combined with a Reynolds number greater than about 4400 and less than about 25000 (e.g., about 7400 to about 25000). The colloidal dispersion includes the diluent, the base, the acid, and abrasive particles from the abrasive particle solution. In some embodiments, the colloidal dispersion further includes one or more of the following: a corrosion inhibitor, an oxidizer, and a surfactant. Additionally or alternatively, the colloidal dispersion can include hydrogen peroxide.

In some embodiments, the abrasive particle solution has a pH above or below the isoelectric potential of the colloidal dispersion. In certain embodiments, the combination of the first and second material flows increases or decreases the pH through the isoelectric potential of the colloidal dispersion. In some embodiments, the continuous colloidal dispersion has a pH of between about 8 to about 12.

In certain embodiments, the concentration of particles in the abrasive particle solution in the second continuous material flow is about 20 percent to about 35 percent by weight. Additionally or alternatively, the concentration of abrasive particles in the colloidal dispersion can be less than about 5 percent by weight.

In some embodiments, combining the first and second continuous material flows includes moving the first and second continuous material flows through at least one static mixer.

In certain embodiments, the acid includes an organic acid. Additionally or alternatively, the acid includes one or more of the following: carboxylic acid, malonic acid, and hydrochloric acid. In some embodiments, the base includes one or more of the following: potassium hydroxide, ammonium hydroxide, and quaternary ammonium. In certain embodiments, the particle solution includes one or more of the following: silica, ceria, and alumina. For example, the particle solution can be a colloidal silica aqueous solution.

In some embodiments, providing the first continuous material flow includes adding a base solution having a base concentration of at least about 15% by weight. The concentration of the base in the first continuous material flow can be diluted to less than about 10% by weight. In certain embodiments, the continuous flow of colloidal dispersion moving downstream has a concentration of the base of less than about 10% by weight (e.g., less than about 1% by weight).

In certain embodiments, providing the first continuous material flow includes adding an acid solution having an acid concentration of at least about 15% by weight. The concentration of the acid in the first continuous material flow can be diluted to less than about 10% by weight. In some embodiments, the continuous flow of colloidal dispersion moving downstream has a concentration of the acid of less than about 10% by weight (e.g., less than about 1% by weight).

In some embodiments, providing the first continuous material flow includes diluting a continuous flow of the base or the acid upstream of the combined first and second continuous material flow. In certain embodiments, providing the second continuous material flow includes diluting the abrasive particle solution upstream of the combined first and second continuous material flows.

In another aspect, a method of forming a colloidal dispersion includes providing a first continuous material flow, providing a second continuous material flow, and forming a colloidal dispersion based at least in part on combining the first and second material flows with a Reynolds number greater than about 4400 and less than about 25000. The first continuous material flow includes one or more of a diluent (e.g., deionized water), an acid, and a base, and the second continuous material flow includes an abrasive particle solution. The colloidal dispersion includes the diluent, the base, the acid, and the abrasive particles. The second continuous material feed has a pH above or below the isoelectric potential of the colloidal dispersion. The combination of the first and second continuous material flows increases or decreases the pH of the second material flow through the isoelectric potential of the colloidal dispersion, and the combination of the first and second continuous material flows increases or decreases the pH of the second material flow through the isoelectric potential of the colloidal dispersion.

In some embodiments, the isoelectric potential of the colloidal dispersion is at a pH of about 4. In certain embodiments, the second continuous material flow has a pH of about 7. Additionally or alternatively, the combined first and second continuous material flows has a pH of less than 3. The final colloidal dispersion can have a pH of about 8 to about 12 (e.g., about 11).

In certain embodiments, a third continuous material flow includes one or more of a diluent, an acid, and a base and forming the colloidal dispersion is based at least in part on combining the third material flow with the combined first and second material flows with a Reynolds number greater than about 4400 and less than about 25000. In certain embodiments, the combination of the third continuous material flow and the combined first and second continuous material flows increases or decreases the pH of the combined first and second continuous material flows through the isoelectric potential of the colloidal dispersion.

In another aspect, a method of analyzing a colloidal dispersion includes providing a first continuous material flow, providing a second continuous material flow, combining the first and second continuous material flows, collecting a sample from a continuous flow of a colloidal dispersion downstream of the combined first and second continuous material flows, exposing the sample to a temperature above room temperature, and monitoring one or more of the following properties of the sample: conductivity, pH, and mean particle size. The first continuous material flow includes one or more of a diluent, a base, and an acid, and the second continuous material flow includes an abrasive particle solution. The colloidal dispersion includes the diluent, the base, the acid, and abrasive particles from the abrasive particle solution.

In certain embodiments, exposing the sample to a temperature above room temperature includes exposing the sample to a temperature above about 60° C. Additionally or alternatively, the sample can be exposed to a temperature above room temperature for a period of over about 24 hours. For example, the sample can be exposed to a temperature above room temperature for a period of about 100 hours to about 170 hours.

In some embodiments, monitoring one or more properties of the colloidal dispersion includes periodically monitoring the one or more properties of the colloidal dispersion.

In certain embodiments, modifying a Reynolds number of the combination of the first and second continuous material flows is based at least in part on the monitored one or more properties of the sample. In some embodiments, modifying the Reynolds number of the combination of the first and second continuous material flows includes increasing a flow rate of at least one of the first and second continuous material flows. Additionally or alternatively, modifying the Reynolds number of the combination of the first and second continuous material flows includes introducing a static mixer between the first and second continuous material flows.

In some embodiments, the order of combination of the diluent, the acid, the base, and the abrasive particle solution can be changed based at least in part on the monitored one or more properties of the sample.

In certain embodiments, collecting a sample from the continuous flow of the colloidal dispersion includes collecting the sample downstream of at least one static mixer.

In some embodiments, the first continuous material flow is combined with the second continuous material flow with a Reynolds number greater than about 4400 and less than about 25000. This Reynolds number range is representative of continuous turbulent mixing that produces colloidal dispersions with robust, long-term stability while facilitating continuous equipment operation (e.g., by reducing downtime associated with the need to replace equipment operating at or near maximum rated capacity) in a safe manner.

In some embodiments, samples of continuously mixing colloidal dispersions are collected, exposed to elevated temperatures for accelerated aging, and monitored. This accelerated aging and monitoring of the continuously mixed colloidal dispersions can facilitate quality control of the colloidal dispersions produced through the continuous mixing process. Additionally or alternatively, the accelerated aging and monitoring of the continuously mixed colloidal dispersions can facilitate tuning the continuous mixing process to produce a continuously mixed colloidal dispersion with long-term stability. For example, the accelerated aging and monitoring process can facilitate identification of adjustments that may be necessary to the Reynolds number associated with the mixing of one or more constituents of the colloidal dispersion.

The details of one or more embodiments of the invention are set forth in the accompanying drawings and the description below. Other aspects, features, and advantages will be apparent from the description and drawings, and from the claims.

DETAILED DESCRIPTION

Figure 1:
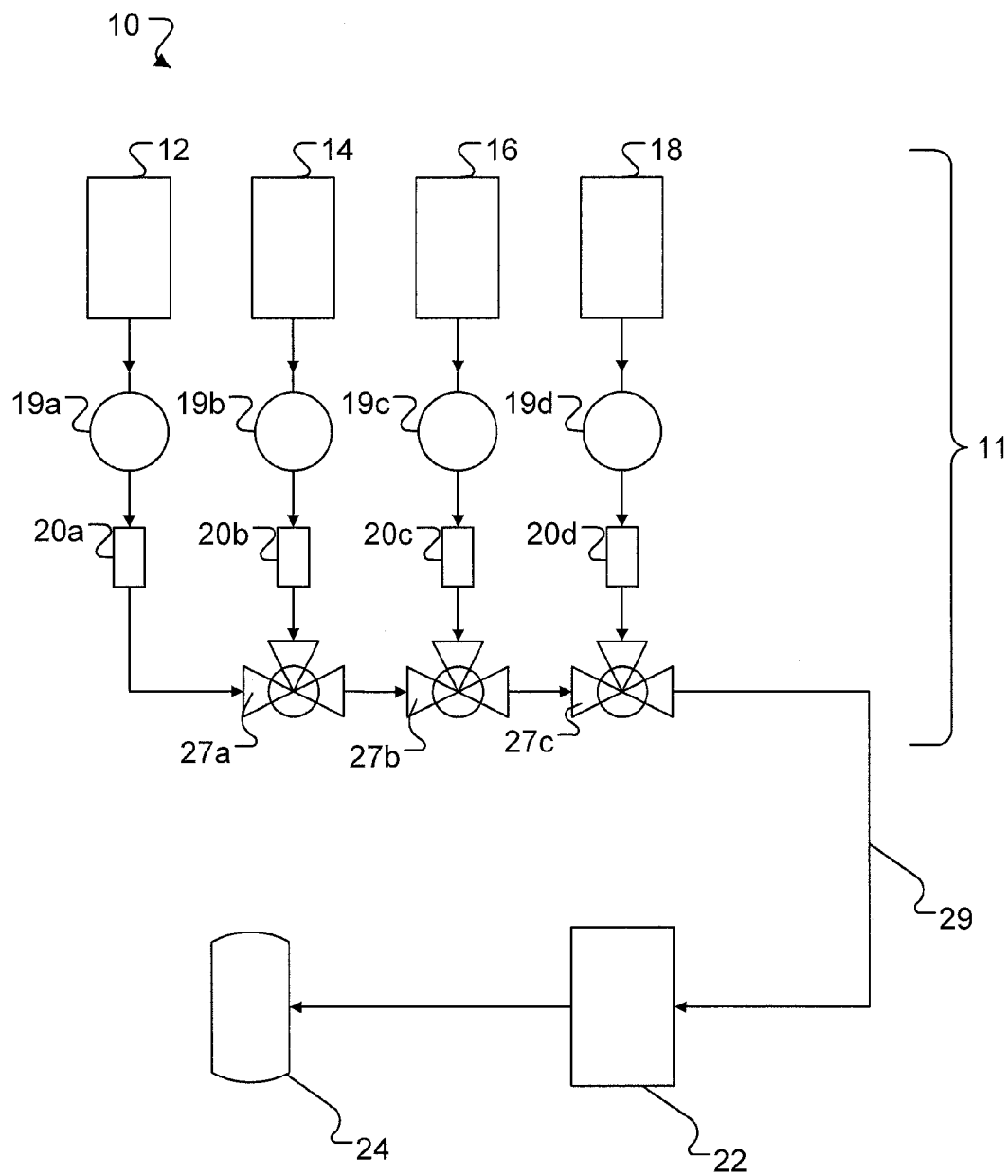
FIG. 1 is a schematic view of a slurry blending plant with a filter station disposed between a product packaging station and a series of in-line mixers.

Referring to FIG. 1, a continuous slurry blending plant 10 includes a mixing station 11, a filter station 22, and a product packaging station 24. The filter station 22 is positioned along a processing stream 29, between the mixing station 11 and the product packaging station 24. As will be described in further detail below, the blending plant 10 can be operated to combine the constituents of the colloidal dispersion (e.g., chemical mechanical planarization slurry) in a continuous flow with sufficient turbulence to produce a high volume of a colloidal dispersion that remains stable (e.g., little to no agglomeration and/or microgellation of the abrasive particles) over a prolonged period (e.g., for use in subsequent downstream processes and/or for packaging and use at another location). Such continuous, turbulent mixing facilitates changing the pH of the solution rapidly through the isoelectric potential (typically at a pH of about 4) of the colloidal dispersion. As compared to laminar flow regimes and/or batch processes, this continuous and turbulent mixing reduces the amount of the time that the solution is at or near the isoelectric potential of the colloidal dispersion during formation of the colloidal dispersion, which reduces the likelihood that salts and/or salt ions will form in the colloidal dispersion. Since these salts and/or salt ions can lead to microgellation in the colloidal dispersion, the use of continuous, turbulent mixing, as described below, can improve the shelf-life (e.g., by reducing the likelihood of microgellation) of the colloidal dispersion as compared to colloidal dispersions made using continuous, laminar or transient flows and/or batch processes.

During use, the mixing station 11 mixes raw materials to form a continuous flow of slurry that moves toward the filter station 22, along the processing stream 29. As used herein, "continuous flow" includes bulk flow that is continuous in a downstream direction (e.g., a net flow rate that varies by less than about fifteen percent during steady-state operation) and/or substantially continuous (e.g., a regularly pulsing flow with net movement in a downstream direction during steady-state operation).

At the filter station 22, agglomerated particles and/or impurities can be removed from the slurry. The filtered slurry then flows to the product packaging station 24 where, for example, the slurry can be used in CMP of wafers or packaged for use at another location. Details of the filter station 22 are described in U.S. patent application Ser. No. 12/702,602, titled "Fluid Processing," filed on Feb. 9, 2010, and published as U.S. Patent Application Pub. 2010/0320127 A1, the entire contents of which are incorporated herein by reference.

The mixing station 11 includes material feeds 12, 14, 16, 18, pumps 19a,b,c,d, flow controllers 20a,b,c,d, and mixers 27a,b,c. Each pump 19a,b,c,d is disposed between a respective material feed 12, 14, 16, 18 and a respective flow controller 20a,b,c,d. The mixers 27a,b,c are in-line pipe mixers (e.g., static mixers) positioned in series along the processing stream 29, and each mixer 27a,b,c includes baffles for inducing swirl (e.g., dual swirl) into the flow of materials introduced into the processing stream 29 through the flow controllers 20a,b,c,d. Each mixer 27a,b,c is positioned downstream of a corresponding flow controller 20a,b,c,d such that there is a respective mixer 27a,b,c downstream of each material feed 12, 14, 16, and 18.

Material feeds 12, 14, 16, 18 each provide an inlet for receiving one or more of the components to be mixed together to form the slurry. For example, each material feed 12, 14, 16, 18 can receive one or more of the following: a diluent, an acid, a base, and an abrasive particle solution. Additionally or alternatively, each material feed 12, 14, 16, 18 can receive one or more of the following: a corrosion inhibitor, an oxidizer (e.g., hydrogen peroxide), and a surfactant.

It should be appreciated that a single raw material can be introduced through more than one of the material feeds 12, 14, 16, 18 to stratify the raw material along the processing stream 29 which can, for example, improve mixing quality. Additionally or alternatively, it should be appreciated that any number of material feeds 12, 14, 16, 18 can be used to introduce the constituent components to the processing stream 29. In some embodiments, only two material feeds 12, 14 are used such that the diluent, the acid, and the base are introduced through one of the material feeds 12, 14 and the abrasive particle solution is introduced through the other material feed. In certain embodiments, more than four material feeds are used.

Each pump 19a,b,c,d moves a raw material from a respective material feed 12, 14, 16, 18 through a respective flow controller 20a,b,c,d. Pumps 19a,b,c,d can be electro-mechanical diaphragm pumps including a sealed diaphragm with one side in fluid communication with the working fluid and the other side in communication with a motor drive. Fluid is pumped as the motor drive flexes the diaphragm.

In some embodiments, each material feed 12, 14, 16, 18 is a collection volume (e.g., a tank) and the respective pumps 19a,b,c,d draw the respective materials from the material feeds 12, 14, 16, 18 at a continuous flow rate. The speed of each pump 19a,b,c,d can be adjusted (e.g., individually adjusted) to adjust the flow rate of the material moving through the respective pump 19a,b,c,d and, therefore, adjust the flow rate through the processing stream. In some embodiments, the speed of each pump 19a,b,c,d can be adjusted to adjust the Reynolds number of the combined flow of a first continuous flow (e.g., a flow including the diluent, the acid, and/or the base) and a second continuous flow (e.g., a flow including the abrasive particle solution).

Each flow controller 20a,b,c,d includes an adjustable orifice and an internal regulating valve that maintains a constant pressure drop across the orifice to achieve a constant volumetric flow rate. The volumetric flow rates through the flow controllers 20a,b,c,d are independently adjustable such that the raw materials can be combined in desired proportions. For example, the volumetric flow rates through the flow controllers 20a,b,c,d can be adjusted to achieve a target concentration of abrasive particles dispersed within the chemically corrosive agent. In certain embodiments, the volumetric flow rate through the flow controllers 20a,b,c,d can be adjusted to adjust the Reynolds number of a first and a second continuous flow.

The diluent can include, for example, deionized water. In some embodiments, as compared to water that is not deionized, the deionized water reduces ionic activity leading to the formation of salts and/or otherwise resulting in particle agglomeration. As described in further detail below, the addition of the diluent through one or more of the material feeds 12, 14, 16, 18 can facilitate the use of concentrated acid, base, and/or particle solutions, which are generally less expensive to transport than the corresponding dilute solutions.

The acid can include, for example, an organic acid and/or an inorganic acid. Additionally or alternatively, the acid can include, for example, carboxylic acid, malonic acid, and hydrochloric acid. As described in further detail below, the acid introduced through the one or more material feeds 12, 14, 16, 18 can have an acid concentration of at least about 15% by weight and can be diluted in the process stream 29 such that the acid has a concentration of less than about 10% by weight (e.g., less than about 1% by weight) in the colloidal dispersion.

The base can include, for example, potassium hydroxide, ammonium hydroxide, and quaternary ammonium. As described in further detail below, the base can be introduced through one or more of the material feeds 12, 14, 16, 18 in a concentrated solution of at least about 15% by weight and can be diluted in the process stream 29 such that the base has a concentration of less than about 10% by weight (e.g., less than about 1% by volume) in the colloidal dispersion.

The abrasive particle solution can include, for example, silica, ceria, and/or alumina. For example, the material feeds 12, 14, 16, 18 can receive one or more of deionized water, potassium hydroxide, malonic acid, and a 7 pH colloidal silica dispersion which are combined, according to methods described below, into a colloidal dispersion having a final pH of about 10.2.

Figure 2:
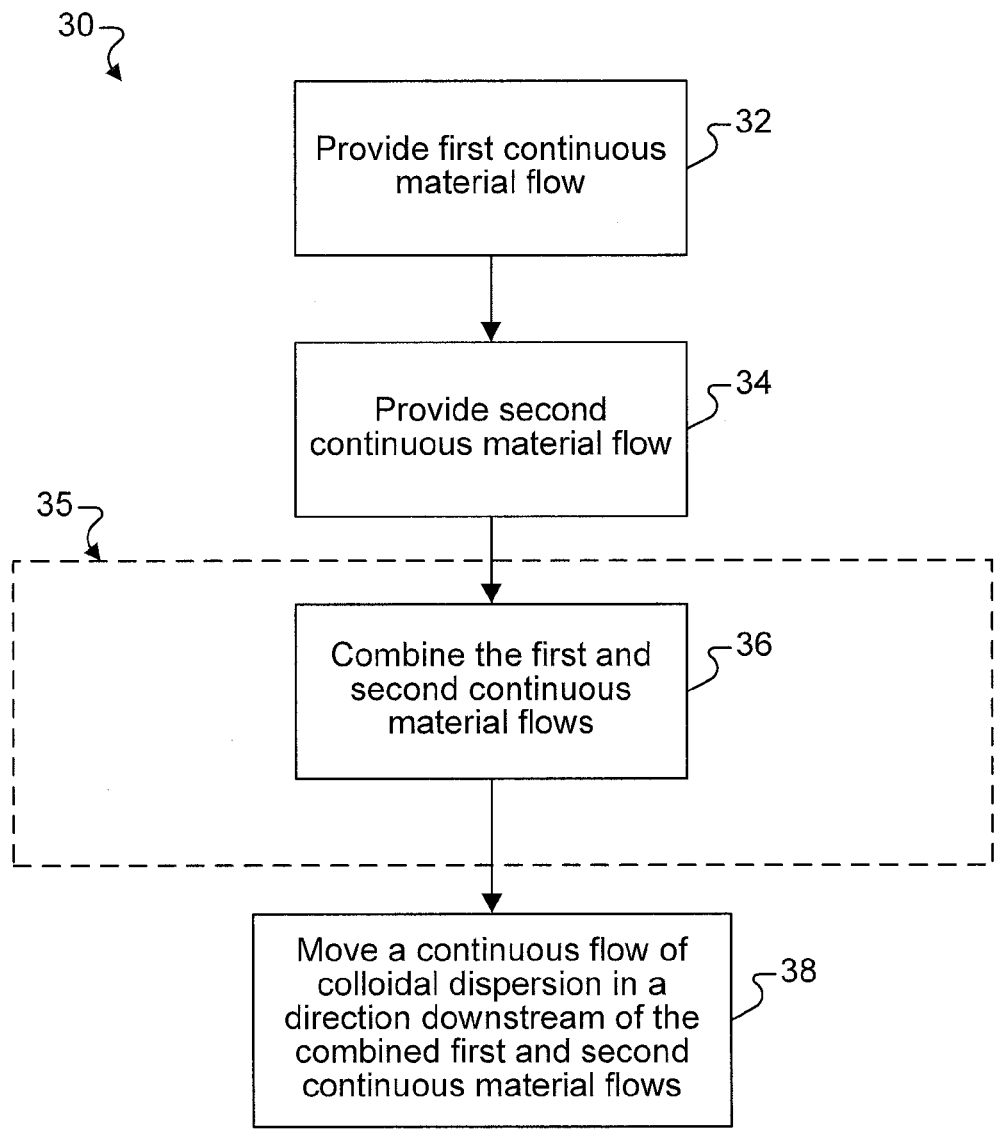
FIG. 2 is a flow chart of a process for forming a colloidal dispersion using the slurry blending plant of FIG. 1.
Figure 3:
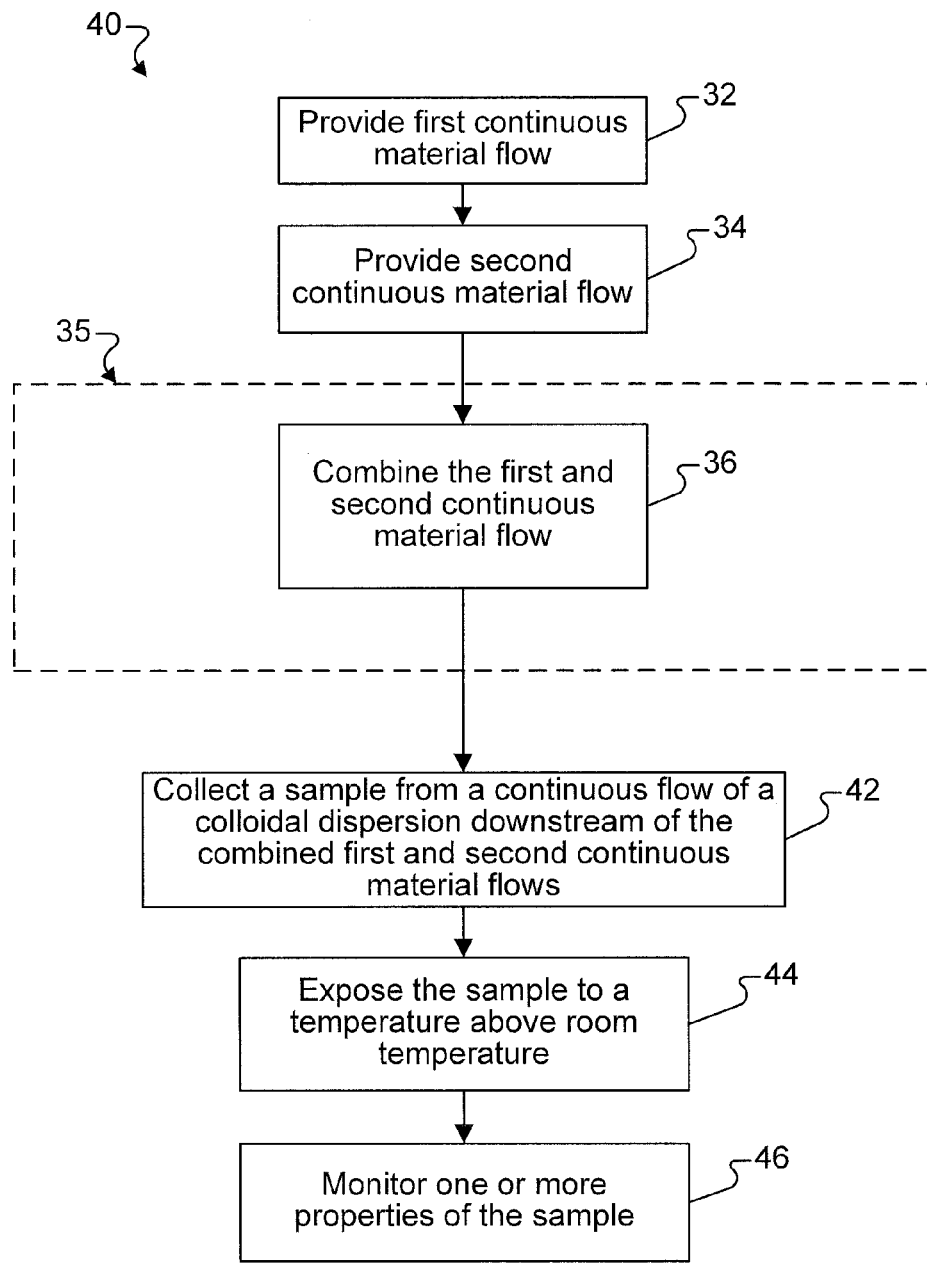
FIG. 3 is a flow chart of a process for analyzing a colloidal dispersion formed in the slurry blending plant of FIG. 1.

Referring now to FIGS. 1-3, a method 30 of using the blending plant 10 to combine the diluent, the acid, the base, and the abrasive particle solution to form a colloidal dispersion. The method 30 includes providing 32 a first continuous material flow, providing 34 a second continuous material flow, forming 35 the colloidal dispersion, and moving 38 a continuous flow of the colloidal dispersion in a direction downstream of the combined first and second continuous material flows. As described in further detail below, forming 35 the colloidal dispersion includes combining 36 the first and second continuous material flows in a turbulent flow to reduce the likelihood of particle agglomeration in the colloidal dispersion and, thus, improve stability of the colloidal dispersion.

Providing 32 the first continuous material flow includes providing one or more of the following: a diluent, a base, and an acid. In some embodiments, the first continuous material flow is provided 32 through more than one of the material feeds 12, 14, 16, 18 such that the first continuous material flow moves through more than one of the mixers 27a,b,c. For example, the first continuous material flow can include the diluent, the base, and the acid and move into the mixer 27c for mixing with an abrasive particle solution, as described below.

The base can be provided 32 in the first continuous material flow as a base solution having a concentration of at least about 15% by weight and diluted to a downstream concentration (e.g., prior to combination with other constituents of the colloidal dispersion and/or in the final colloidal dispersion) of less than about 10% by weight (e.g., less than about 1% by weight). Additionally or alternatively, the acid can be provided 32 in the first continuous material flow as an acid solution having a concentration of at least about 15% by weight and diluted to a downstream concentration (e.g., prior to combination with other constituents of the colloidal dispersion and/or in the final colloidal dispersion) of less than about 10% by weight (e.g., less than about 1% by weight).

As indicated above, the acid can be introduced through one or more of the material feeds 12, 14, 16, 18 in a concentrated solution of at least about 15% by weight. In some embodiments, this concentrated acid solution can be diluted prior to mixing the acid with the other constituents of the colloidal dispersion. For example, the diluent can be introduced through the material feed 12 and the concentrated acid solution can be introduced through the material feed 14 such that the concentrated acid solution is diluted in the mixer 27a. The diluted acid mixture can then be mixed with an abrasive particle solution introduced through one or more of the material feeds 16 and 18.

Providing 34 the second continuous material flow includes providing an abrasive particle solution. In some embodiments, the second continuous material flow can be provided 34 through more than one of the material feeds 12, 14, 16, 18 such that the second continuous material flow moves through more than one of the mixers 27a,b,c. As will be described in further detail below, the stability of the colloidal dispersion appears to be insensitive to the order in which the constituents of the colloidal dispersion are combined. Thus, in some embodiments, the second continuous material flow is introduced into the process stream 29 upstream of the first continuous material flow. For example, the second continuous material flow can be defined by the flow path including the material feed 12, the pump 19a, and the flow controller 20a while the first continuous material flow can be defined by the flow path including the material feed 14, the pump 19b, and the flow controller 20b. In certain embodiments, the second continuous material flow is introduced into the process stream 29 downstream of the first continuous material flow in an analogous manner.

In some embodiments, the concentration of particles in the abrasive particle solution is about 20 percent to about 35 percent by volume. Additionally or alternatively, the concentration of particles can be diluted (e.g., by addition of the diluent in the second continuous material flow) such that the concentration of the abrasive particles is about 5 percent by volume. For example, the concentration of the abrasive particles can be about 5 percent by volume in the colloidal dispersion.

Forming 35 the colloidal dispersion includes combining 36 the first continuous material flow (e.g., the diluent, the acid, and/or the base) with the second continuous material flow (e.g., the abrasive particle solution). The first and second continuous material flows are combined 36 a Reynolds number above about 4400 and less than about 25000 (e.g. about 7400), where the Reynolds number is a dimensionless ratio of the inertial forces to the viscous forces in a flow and is generally proportional to the turbulence of the flow. For a pipe or duct, the Reynolds number is expressed as:

$$Re = QD_H / \upsilon A$$

where Re is the Reynolds number, Q is the volumetric flow rate (m$^3$/s), $D_H$ is the hydraulic diameter of the pipe (m), $\upsilon$ is the kinematic viscosity (m$^2$/s) of the fluid moving through the pipe, and A is the pipe cross-sectional area (m$^2$).

For flow moving through a pipe such as the process stream 29, Reynolds numbers below about 2300 correspond to laminar flow and Reynolds numbers above about 4000 correspond to turbulent flow. The flow characterized by Reynolds numbers between about 2300 and about 4000 is referred to herein as transient or transitional flow and is between laminar flow and turbulent flow. As described in further detail below, it has been experimentally determined that the formation of a stable colloidal dispersion requires a combination 36 of the first and second continuous material flows with a Reynolds number greater than about 4400 (e.g., about 7400). The maximum Reynolds number for combining 36 the first and second continuous material flows is less than about 25000, based on considerations such as equipment performance constraints, safety, and durability.

In some embodiments, the abrasive particle solution provided 34 in the second continuous material flow has a pH above or below the isoelectric potential of the colloidal dispersion. For example, the abrasive particle solution can have a pH of about 7 and the isoelectric potential of the colloidal dispersion can be at a pH of about 4. An acidic wetting agent can be provided 32 in the first continuous material flow and combined 36 with the abrasive particle solution such that the pH of the resulting mixture is less than 3. By combining 36 the first and second continuous material flows with a Reynolds number greater than about 4400 and less than about 25000 (e.g., greater than about 7400 and less than about 25000), the change in pH level of the mixture moves rapidly through the isoelectric potential such that the likelihood of formation of salts and/or salt ions is reduced as compared to the likelihood of formation that would otherwise occur through mixing at Reynolds numbers below about 4400 (e.g., laminar flow and/or transient flow). A colloidal dispersion can be formed 35 by addition of a base (e.g., in a third continuous material flow) to the combined 36 first and second continuous material such that the pH of the resulting colloidal dispersion is about 8 to about 12. This formation 35 can additionally or alternatively occur through mixing at Reynolds numbers greater than about 4400 and less than about 25000 to facilitate rapid change in the pH level of the mixture through the isoelectric potential. In some embodiments, combining 36 the first and second material flows including increasing the pH through the isoelectric potential of the colloidal dispersion.

The continuous flow of the colloidal dispersion is moved 38 in a direction downstream of the combined 36 first and second continuous material flows. The Reynolds number of this continuous flow of the colloidal dispersion can be less than the Reynolds number of the combination 36 of the first and second continuous material flows. For example, combining 36 the first and second continuous material flows can occur in one or more of the mixers 27a,b,c and the colloidal dispersion can be moved 38 in a direction downstream in a pipe such that the Reynolds number of the combination 36 in the mixers 27a,b,c is greater than the Reynolds number in a pipe carrying the downstream processing stream 29. In some embodiments, moving 38 the colloidal dispersion includes collecting all or a portion of the colloidal dispersion moving in the processing stream 29.

A method 40 of analyzing a colloidal dispersion includes collecting 42 a sample from a continuous flow of the colloidal dispersion (e.g., the colloidal dispersion moving 38 downstream), exposing 44 the collected sample to a temperature above room temperature, and monitoring 46 one or more properties of the sample. The Reynolds number of the combined 36 first and second continuous material flows can be adjusted based at least in part on the one or more monitored 46 properties of the sample. Such adjustment can facilitate setting flow parameters that will result in substantially stable colloidal dispersions.

Collecting 42 the sample from the continuous flow of the colloidal dispersion can include automatically (e.g., at fixed periodic intervals) drawing off a portion of the processing stream 29. In some embodiments, the sample is about 0.5 to about 5 liters such that the collected sample is representative of the colloidal dispersion flowing through the processing stream 29. In certain embodiments, the sample is collected 42 downstream of one or more static mixers 27a,b,c such that the collected 42 sample has been exposed to the most turbulent flow in the processing stream 29.

Exposing 44 the sample to a temperature above room temperature (20° C.) accelerates the aging of the sample to facilitate determination of long-term stability of the colloidal dispersion. For example, the sample can be exposed (e.g., in an oven) to a temperature of about 40° C. to about 80° C. (e.g., about 45° C. to about 65° C.) for a first period to provide an indication of the stability of the colloidal dispersion for a second, longer period (e.g., about several days). Thus, exposing 44 the sample to a temperature above room temperature can reduce the amount of time required to assess the long-term stability of the colloidal dispersion. As compared to methods that do not include accelerated aging of a colloidal dispersion sample, the accelerated aging of the colloidal dispersion sample can reduce, for example, the amount of time required set up the blending plant 10 for production of a stable colloidal dispersion.

In some embodiments, the duration of the exposure 44 of the sample to the elevated temperature is over about 100 hours. For example, as described below, it has been observed that the long term stability of the colloidal dispersions become observable after over about 100 hours of exposure to a temperature of about 60° C. In some embodiments, longer periods of exposure of the sample to about 60° C. do not provide additional information regarding the long-term stability of the colloidal dispersion.

Monitoring 46 one or more properties of the collected 42 sample can include monitoring one or more of the following properties of the colloidal dispersion: conductivity, pH, and mean particle size. For example, the one or more properties of the collected 42 sample can be monitored 46 periodically (e.g., every hour, every 24 hours) during the exposure 44 of the sample to the temperature above room temperature. Additionally or alternatively, the one or more properties of the collected 42 sample can be monitored 46 at the end of the exposure 44 of the sample to the temperature above room temperature.

Based at least in part on the monitored 46 one or more properties of the collected 42 sample, the blending plant 10 can be modified to change the Reynolds number of the combination of the first and second continuous material flows. For example, one or more of the flow controllers 20a,b,c,d can be adjusted to increase the Reynolds number to achieve, for example, turbulent mixing of the first and second continuous material flows. Additionally or alternatively, one or more of the flow controllers 20a,b,c,d can be adjusted to decrease the Reynolds number, for example, to maintain turbulent mixing of the first and second continuous material flows while achieving an overall flow rate that can be reliably and safely handled by the pumps 19a,b,c,d, filter station 22, and/or the product packaging station 24.

In some embodiments, one or more static mixers 27a,b,c are added between the first and second continuous material flows based at least in part on the monitored 46 one or more properties of the collected 42 sample. For example, in an initial setup of the blending plant 10, the first and second continuous material flows can be combined in a pipe, without a static mixer. If the monitored 46 property suggests that the resulting colloidal dispersion will not have an acceptable long-term stability, one or more of the static mixers 27a,b,c can be added between the first and second continuous material flows to increase the Reynolds number.

In certain embodiments, the order of combination of the diluent, the acid, the base, and the abrasive particle solution can be changed based at least in part on the monitored 46 one or more properties of the collected 42 sample. For example, if it is observed that the conductivity (e.g., ionic content) of the solution is lower if the abrasive particle solution is added to a diluted acid and/or diluted base, the diluent can be added to a first continuous material flow that includes the acid and/or the base.

Figure 4:
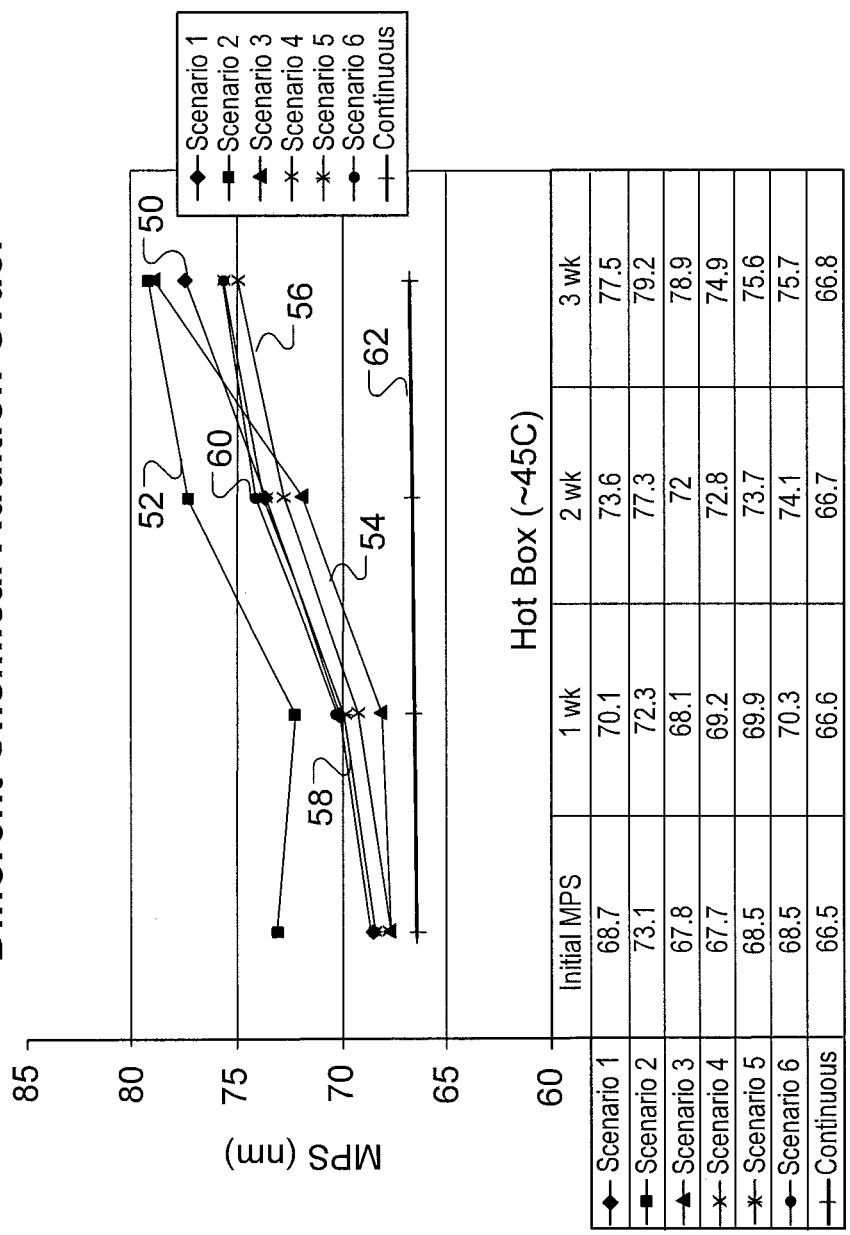
FIG. 4 is a graph of the mean particle size of a slurry formed using batch processes and continuous mixing.
Figure 5:
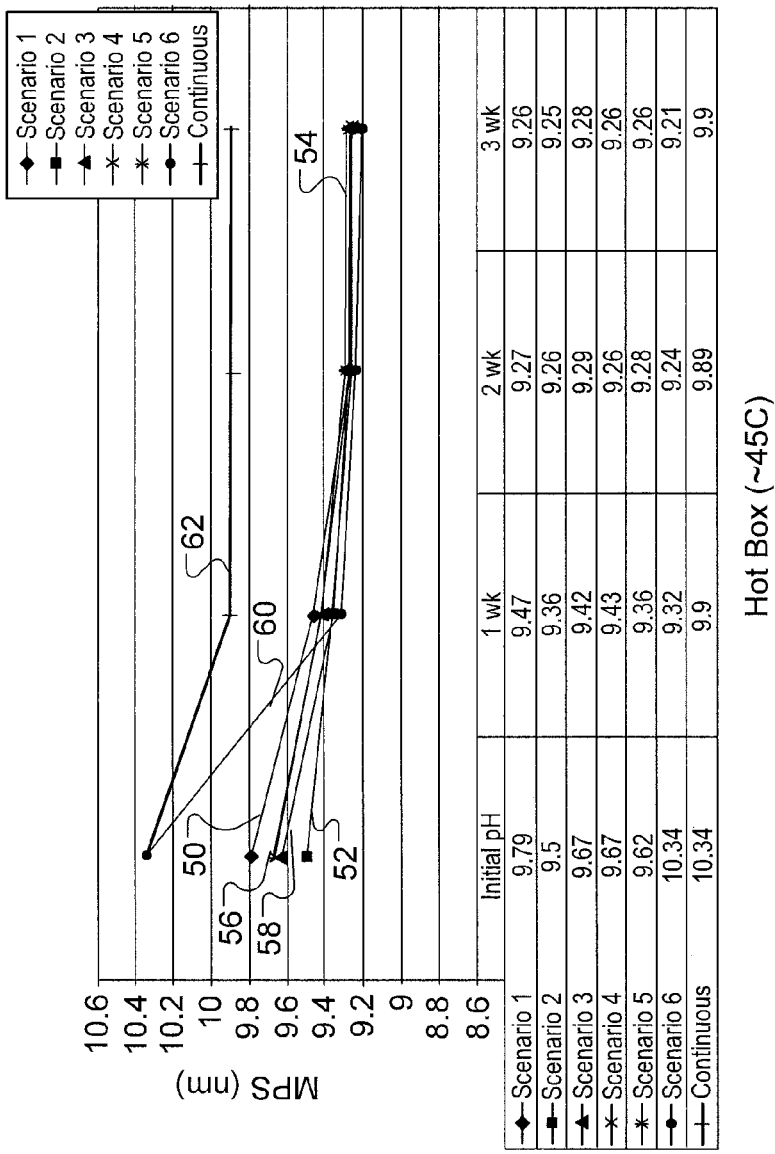
FIG. 5 is a graph of the pH level of a slurry formed using batch processes and continuous mixing.

FIGS. 4 and 5 show a comparison of the long-term stability of the mean particle size and pH levels of colloidal dispersions prepared using batch processes and a colloidal dispersion prepared using a continuous mixing process. In FIGS. 4 and 5, the colloidal dispersions prepared using batch processes are represented by curves 50, 52, 54, 56, 58, and 60 and curve 62 represents the colloidal dispersion prepared using a continuous mixing process. Each colloidal dispersion shown in FIGS. 4 and 5 is a combination of deionized water, a 45% by weight potassium hydroxide solution (base), a 50% by weight carboxylic acid blend having a conductivity of 6.3 mS/cm (acid), a 20% solid colloidal silica dispersion (particles), and a 1% by weight corrosion inhibitor solution (corrosion inhibitor).

The colloidal dispersions prepared using batch processes were prepared by using a 1 L beaker to weigh out water on a scale. Then each individual chemical was weighed out separately and added to the beaker, which was on a stir plate mixing with a slight vortex. The conductivity, pH, and MPS were taken after each chemical was added and prior to addition of the next chemical. The orders of the chemicals were changed to assess whether the order of addition of the chemicals would impact the long-term stability of the colloidal dispersion.

The colloidal dispersion corresponding to curve 50 was prepared by addition of chemicals in the following order: water, particles, acid, base, and corrosion inhibitor. The pH level of the particles in water was initially 7.5 and decreased to 2.17 upon addition of the acid. The subsequent addition of the base increased the pH to 10.23, and the further addition of the corrosion inhibitor decreased the pH to 9.79. The conductivity of the particles in water was initially 0.0208 mS/cm, increased to 0.0304 mS/cm upon addition of the acid, further increased to 13.87 mS/cm upon addition of the base, and increased again to 14.45 mS/cm. The mean particle size of the solution upon addition of the acid was 68.7 nm and remained approximately constant upon subsequent addition of the base and the corrosion inhibitor.

The colloidal dispersion corresponding to curve 52 was prepared by the addition of chemicals in the following order: water, base, acid, particles, and corrosion inhibitor. The pH level of the solution upon addition of the base to the water was 13.89, decreased to 13.1 upon addition of the acid, decreased again to 10.14 upon addition of the particles, and further decreased to 9.67 upon addition of the corrosion inhibitor. The conductivity of the solution upon addition of the base to the water was 71.8 mS/cm, decreased to 65.5 mS/cm upon addition of the acid, further decreased to 13.92 mS/cm upon addition of the particles, and increased to 14.4 upon addition of the miscellaneous chemical. The mean particle size of the particles added to the water/acid/base mixture was 68.6 nm and decreased to 67.8 upon addition of the corrosion inhibitor.

The colloidal dispersion corresponding to curve 54 was prepared by the addition of the chemicals in the following order: water, particles, base, acid, and corrosion inhibitor. The pH of the particles and water was initially 7.53, increased to 12.19 upon addition of the base, decreased to 9.8 upon addition of the acid, and decreased again to 9.5 upon addition of the corrosion inhibitor. The conductivity of the particles and water was initially 0.0215 mS/cm, increased to 8.51 mS/cm upon addition of the base, increased to 13.69 mS/cm upon addition of the acid, and 14.4 upon addition of the corrosion inhibitor. The mean particle size of the water/particle/base mixture was 67.3 nm, increased to 72.4 nm upon addition of the acid, and further increased to 73.1 nm upon addition of the corrosion inhibitor.

The colloidal dispersion corresponding to curve 56 was prepared by the addition of chemicals in the following order: water, acid, base, particles, and corrosion inhibitor. The pH of the initial water and acid mixture was 0.5, increased to 13.02 upon addition of the base, decreased to 10.18 upon addition of the particles, and further decreased to 9.67 upon addition of the corrosion inhibitor. The conductivity of the initial water and acid mixture was 34.1 mS/cm, increased to 64.1 mS/cm, decreased to 13.86 mS/cm upon addition of the particles, and increased to 14.4 mS/cm upon addition of the corrosion inhibitor. The mean particle size of the water/acid/base/particle mixture was 68.8 nm and decreased to 67.7 upon addition of the corrosion inhibitor.

The colloidal dispersion corresponding to curve 58 was prepared by the addition of chemicals in the following order: water, acid, particles, base, and corrosion inhibitor. The pH of the initial water and acid mixture was 0.48, the addition of particles increased the pH to 2.08, the addition of the base further increased the pH to 10.13, and the addition of the corrosion inhibitor decreased the pH to 9.62. The conductivity of the initial water and acid mixture was 34.8 mS/cm, decreased to 3.05 mS/cm upon addition of the particles, increased to 13.81 mS/cm upon addition of the base, and further increased to 14.41 mS/cm upon addition of the corrosion inhibitor. The mean particle size of the water/acid/particle mixture was 66.6 nm, increased to 68.0 nm upon addition of the base, and increased to 68.5 nm upon addition of the corrosion inhibitor.

The colloidal dispersion corresponding to curve 60 was prepared by the addition of chemicals in the following order: water, base, particles, acid, and corrosion inhibitor. The pH of the initial water and base mixture was 13.92, decreased to 12.42 upon addition of the particles, decreased again to 9.8 upon addition of the acid, and further decreased to 9.43 upon addition of the corrosion inhibitor. The conductivity of the initial water and base mixture was 72.4 mS/cm, decreased to 10.15 mS/cm upon addition of the particles, increased to 13.68 mS/cm upon addition of the acid, and increased again to 14.41 mS/cm upon addition of the corrosion inhibitor. The mean particle size of the water/base/particle mixture was 67.7 nm, remained approximately constant (67.6 nm) upon addition of the acid, and increased to 68.5 nm upon addition of the corrosion inhibitor.

The colloidal dispersion prepared using the continuous mixing process was prepared using a blending plant similar to the blending plant 10 (FIG. 1) such that each constituent of the colloidal dispersion was added to the processing stream 29 (FIG. 1) in a continuous flow.

The colloidal mixtures prepared using the batch processes and continuous mixing process were placed in a hot box at a temperature of about 45° C. for a period of about 3 weeks. The mean particle size and the pH of each colloidal dispersion were monitored during the course of the three weeks and recorded.

As shown in FIG. 4, the mean particle size of the colloidal dispersion prepared through continuous mixture (curve 62) was relatively unchanged after three weeks of exposure to 45° C. while the respective mean particle sizes of the colloidal dispersions prepared through batch processes (curves 50, 52, 54, 56, 58, and 60) increased significantly after three weeks of exposure to 45° C. This increase in mean particle size indicates that colloidal dispersions prepared using batch processes, regardless of chemical mixing order, are relatively unstable over the long-term, as compared to a colloidal dispersion prepared using a continuous mixing process.

As shown in FIG. 5, the pH of each mixture decreased initially and appeared to reach a steady state value. This trend was generally present for colloidal dispersions prepared using batch mixing processes and continuous mixing processes, although the colloidal dispersion prepared using the continuous process appeared to reach its steady state level in less time than the colloidal dispersions prepared using the batch processes.

FIGS. 6-14 show the long-term stability of colloidal dispersions prepared using continuous mixing processes using different chemical mixing orders and different amounts of mixing turbulence (Reynolds numbers). Each colloidal dispersion shown in FIGS. 6-14 is a combination of deionized water, a 45% by weight potassium hydroxide solution (base), a 50% by weight carboxylic acid blend having a conductivity of 6.3 mS/cm (acid), and a 20% solid colloidal silica dispersion (particles).

In these figures, the curves 64a,b,c correspond to colloidal dispersions prepared using continuous mixing in the following mixing order: water, base, particle, acid. The curves 66a,b,c correspond to colloidal dispersions prepared using continuous mixing in the following mixing order: particles, base, water, and acid. The curves 68a,b,c correspond to colloidal dispersions prepared using continuous mixing in the following mixing order: particles, acid, water, and base. For each set of curves, the letter "a" corresponds to mixing carried out in laminar flow (Re=2000), the letter "b" corresponds to mixing carried out in transient flow (Re=4400), and the letter "c" corresponds to mixing carried out in turbulent flow (Re=7400). Thus, for example, the curve 68b corresponds to a colloidal dispersion prepared in a transient flow by adding particles, acid, water, and a base, in that order.

For each experiment shown in these figures, the colloidal dispersions were prepared using a blending plant similar to the blending plant 10 (FIG. 1), except the static mixers were taken out so that the mixing took place in a pipe and the Reynolds number could be accurately calculated. It should be appreciated that the introduction of static mixers in the system would increase the Reynolds number which, as described below, would increase the mixing and stability of the colloidal dispersion. The mean particle size, pH, and conductivity of each colloidal dispersion were monitored throughout an accelerated oven aging test at 60° C.

Figure 6:
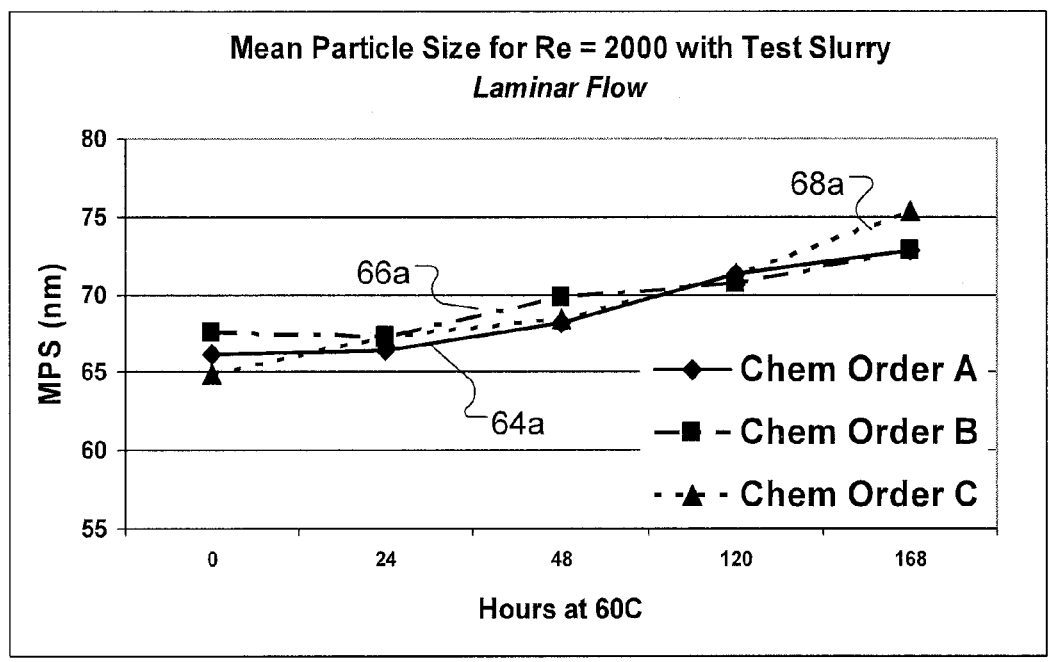
FIG. 6 is a graph of the mean particle size of a slurry formed by different chemical addition orders in a laminar flow.

FIG. 6 shows the mean particle size of colloidal dispersions 64a, 66a, and 68a prepared in a laminar (Re=2000) continuous flow. As shown in the figure, the mean particle size of these colloidal dispersions increases over time, regardless of the mixing order. Thus, preparation of colloidal dispersions in a laminar continuous flow does not appear to have long-term stability suitable for applications such as chemical mechanical planarization.

Figure 7:
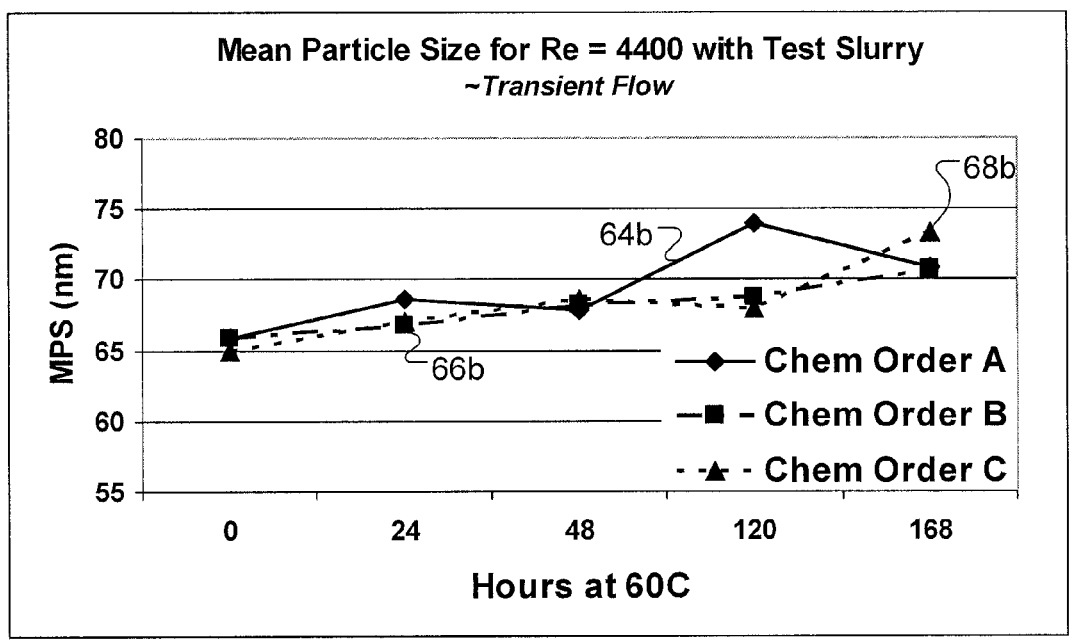
FIG. 7 is a graph of the mean particle size of a slurry formed by different chemical addition orders in a transient flow.

FIG. 7 shows the mean particle size of colloidal dispersions 64b, 66b, and 68b prepared in a transient (Re=4400) continuous flow. As shown in the figure, the mean particle size of these dispersions also tends to increase over time, although to a lesser extent than observed in FIG. 6 with respect to the laminar flow.

Figure 8:
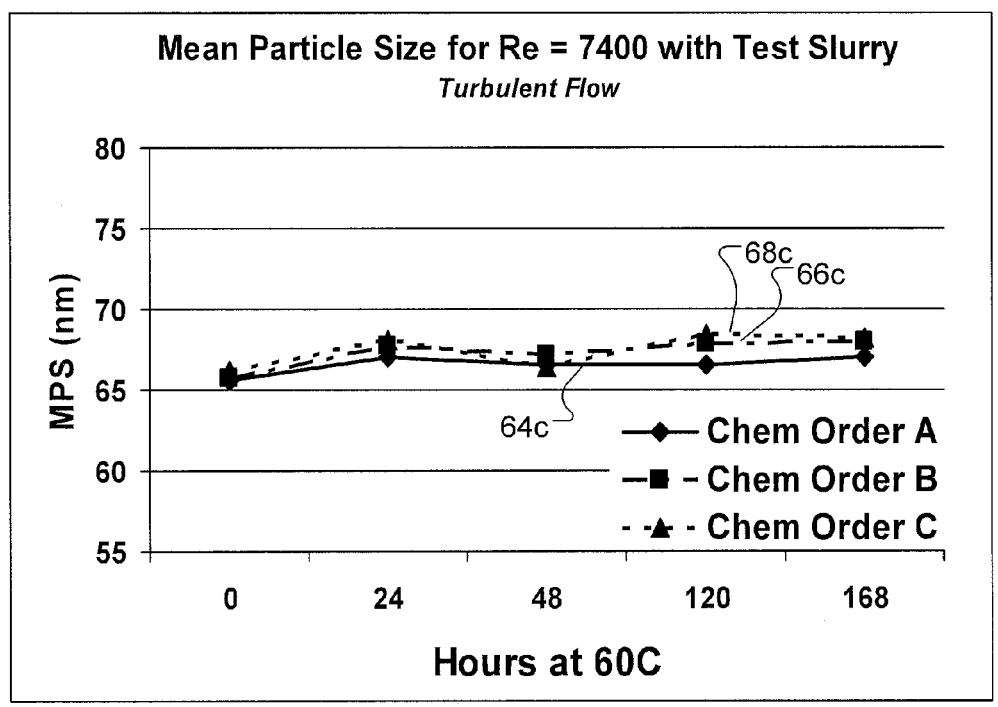
FIG. 8 is a graph of the mean particle size of a slurry formed by different chemical addition orders in a turbulent flow.

FIG. 8 shows the means particle size of colloidal dispersions 64c, 66c, 68c prepared in a turbulent (Re=7400) continuous flow. As shown in the figure, the mean particle size of these dispersions remains relatively constant over time, indicating long-term stability suitable for applications such as chemical mechanical planarization. Thus, taken together, the results of FIGS. 6-8 generally indicate that continuously mixing chemicals in a turbulent flow regime will result in a colloidal dispersion that has long-term stability suitable for use in chemical mechanical planarization.

Figure 9:
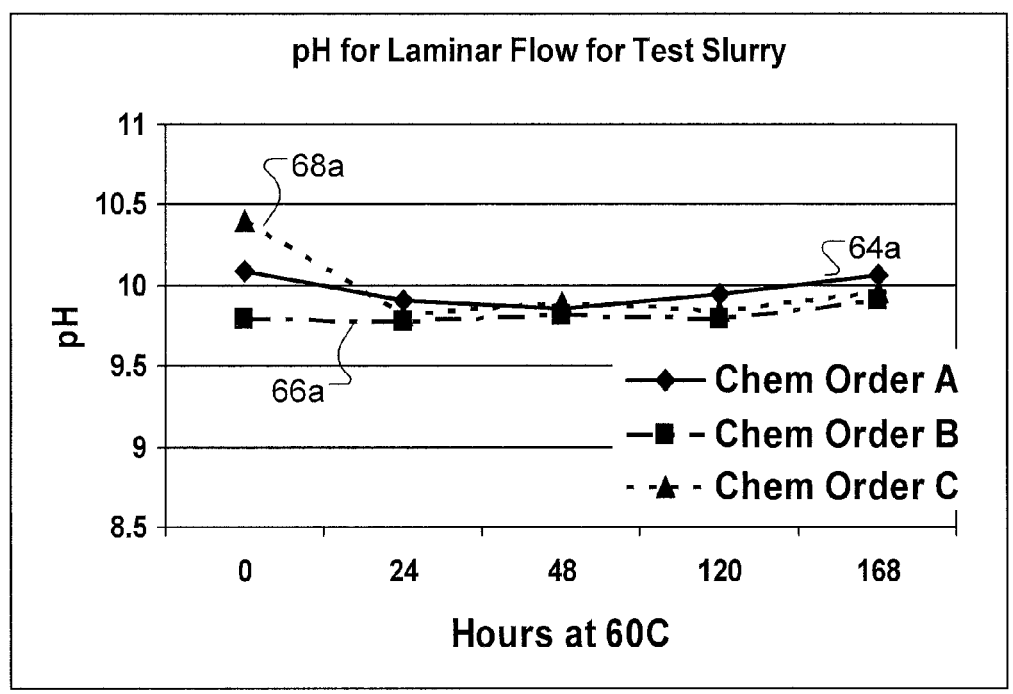
FIG. 9 is a graph of the pH level of a slurry formed by different chemical addition orders in a laminar flow.
Figure 10:
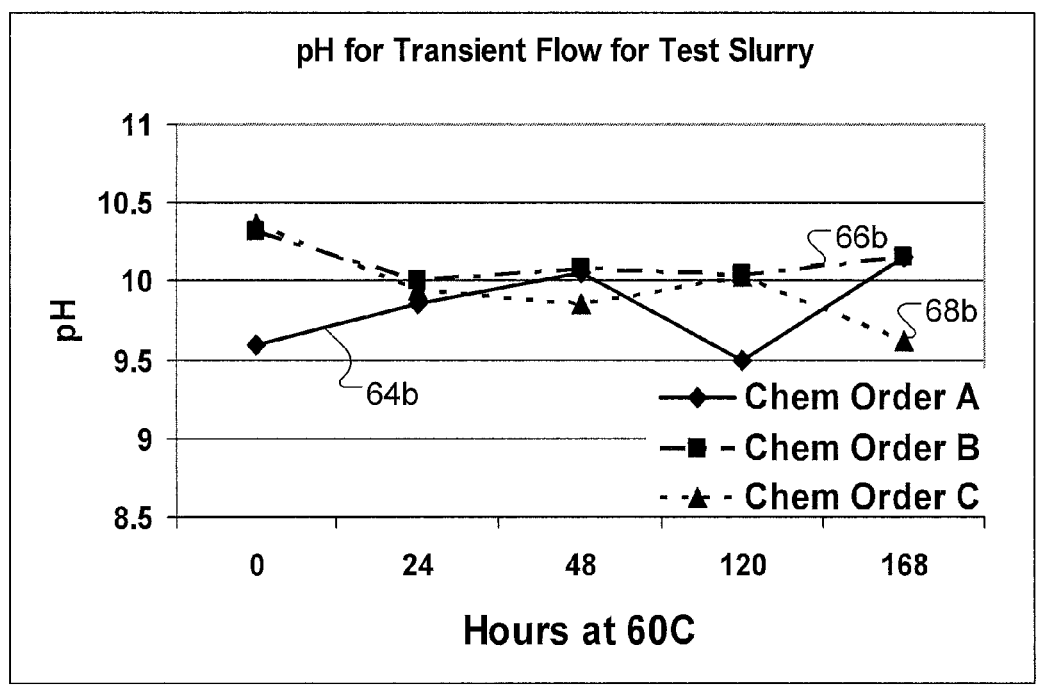
FIG. 10 is a graph of the pH level of a slurry formed by different chemical addition orders in a transient flow.
Figure 11:
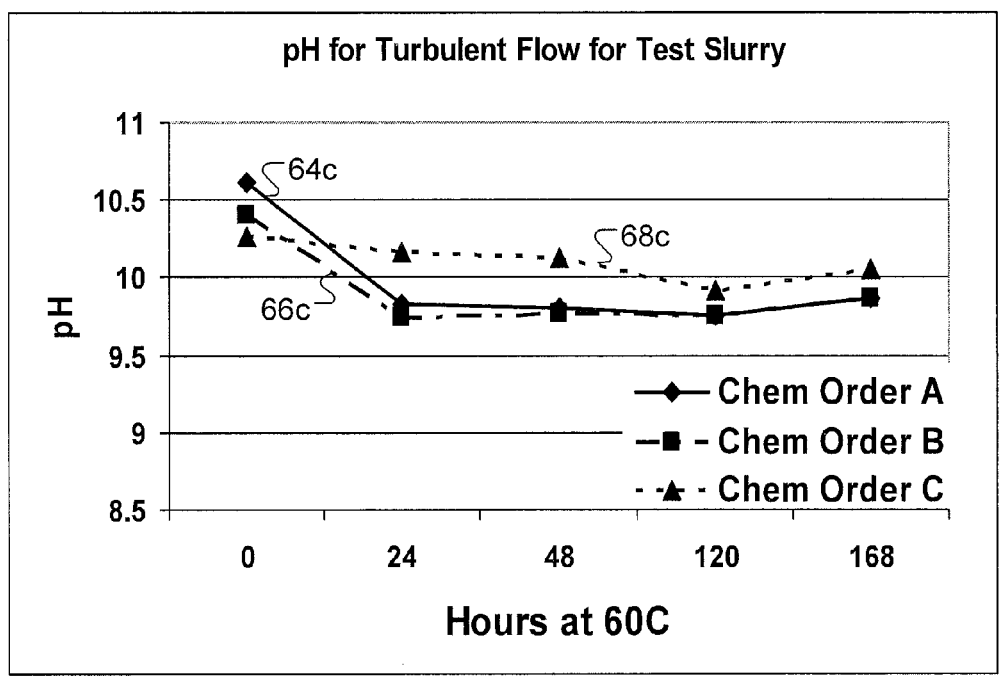
FIG. 11 is a graph of the pH level of a slurry formed by different chemical addition orders in a turbulent flow.

FIGS. 9-11 show the pH of the colloidal dispersions 64a,b,c, 66a,b,c, and 68a,b,c. For laminar and turbulent flows shown in FIGS. 9 and 11, the pH level drops initially and appears to stabilize. However, for transient flows shown in FIG. 10, the pH level is variable throughout the aging cycle. The large variations in pH level characteristic of transient flow can result in microgellation (e.g., through variations in pH levels through the isoelectric potential). This result suggests that the long-term stability of colloidal dispersions prepared in transient flow is unpredictable.

Figure 12:
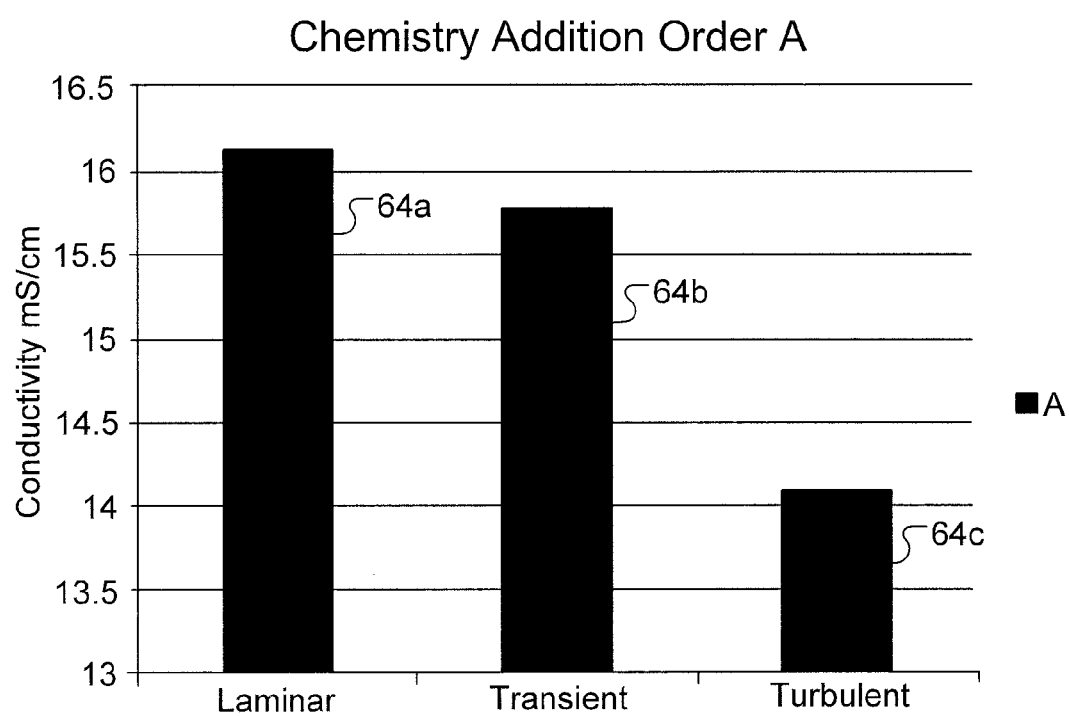
FIG. 12 is a graph of the conductivity of a slurry formed in a chemical addition order in laminar, transient, and turbulent flows.
Figure 13:
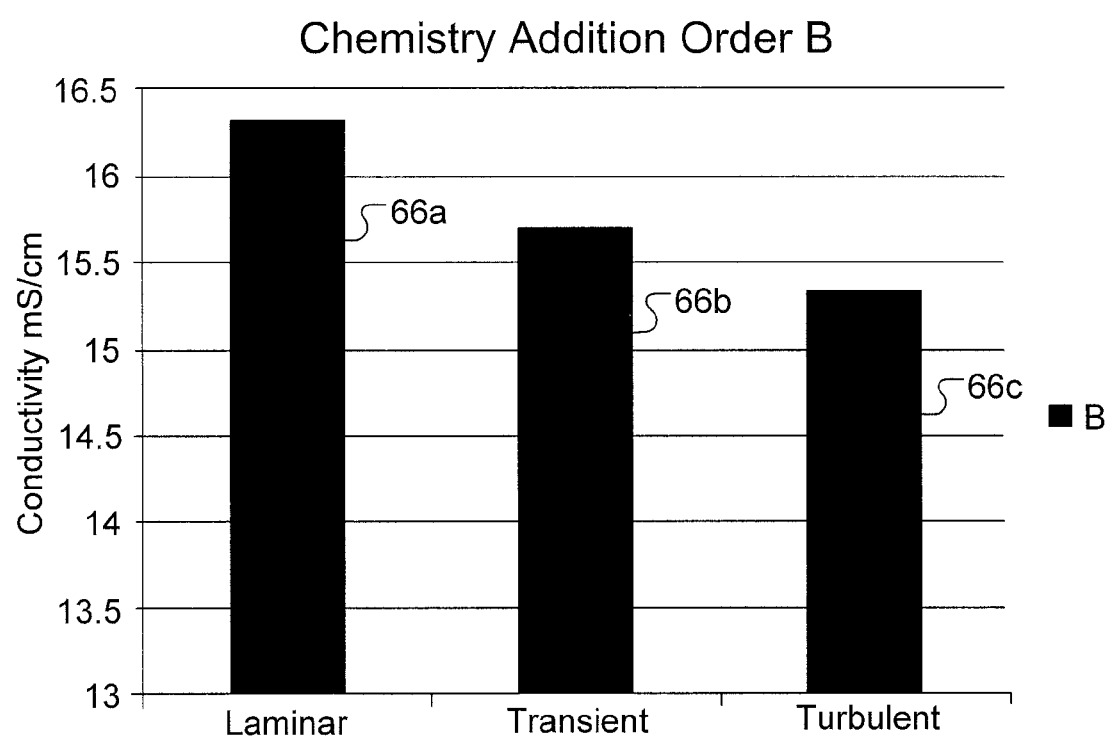
FIG. 13 is a graph of the conductivity of a slurry formed in a chemical addition order in laminar, transient, and turbulent flows.
Figure 14:
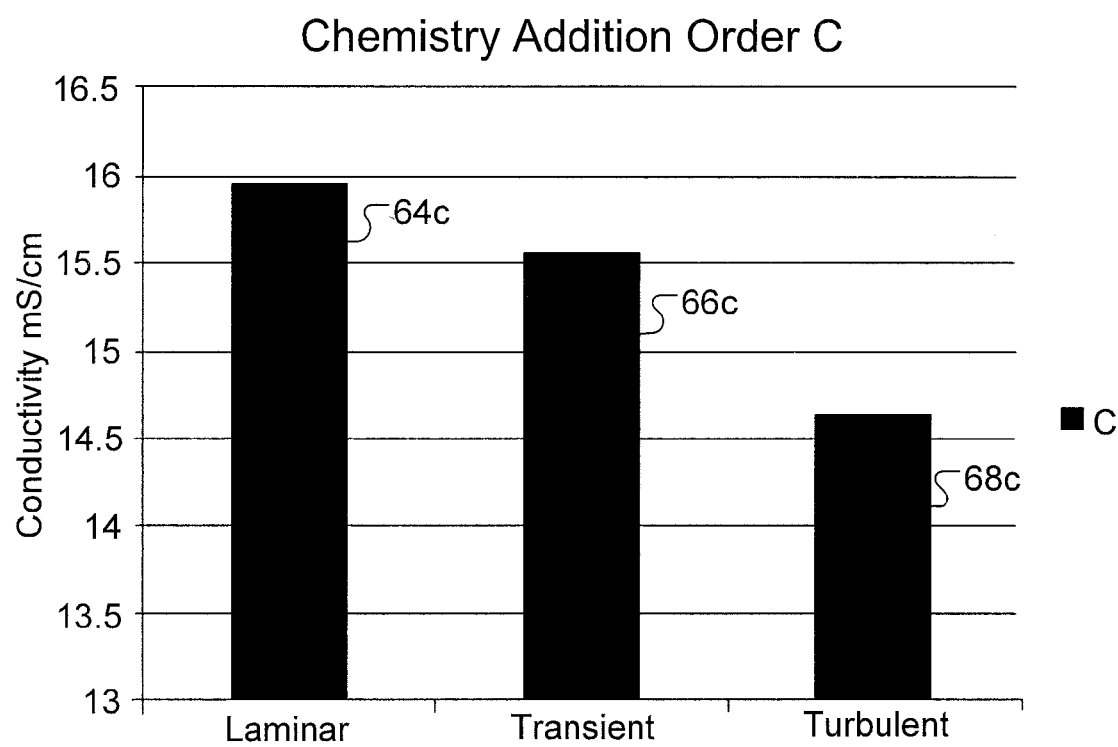
FIG. 14 is a graph of the conductivity of a slurry formed in a chemical addition order in laminar, transient, and turbulent flows.

FIGS. 12-14 show the conductivity of the colloidal dispersions 64a,b,c, 66a,b,c, and 68a,b,c. As shown in each of these figures, regardless of the chemical addition order, the conductivity (indicative of the concentration of salts and/or salt ions) of the colloidal dispersions decreases with increasing turbulence, with the lowest conductivity observed for the colloidal dispersion prepared using turbulent (Re=7400) mixing.

Taken together, the results of these experiments indicate that a stable colloidal dispersion is generally achieved by increasing the Reynolds number used in a continuous mixing process used to form the colloidal dispersion. However, for Reynolds numbers corresponding to transient flow, the large variability of pH level over time can make the long-term stability of the colloidal dispersion difficult to predict. Therefore, continuously mixing colloidal dispersions using Reynolds numbers above the transient flow regime is useful for creating colloidal dispersions with robust long-term stability.

The upper end of the Reynolds number range that can be used to create a colloidal dispersion with robust long-term stability may be limited by considerations such as equipment performance capacity (e.g., pump speeds), equipment durability, safety, and diminishing returns. Therefore, a practical upper end of the Reynolds number range for continuously mixing colloidal dispersions using the blending plant 10 (FIG. 1) is about 25000.

While certain embodiments have been described, other embodiments are possible.

For example, while the static mixers 27a,b,c have been described as having two inlets and an outlet, other embodiments are possible. For example, each static mixer 27a,b,c can have an inlet for each constituent of the colloidal dispersion such that all of the constituents of the colloidal dispersion are passed through the static mixer at one time.

What is claimed is:

1. A method of forming a colloidal dispersion, the method comprising:
   providing a first continuous material flow comprising a diluent, a base, and an acid;
   providing a second continuous material flow comprising an abrasive particle composition; and
   combining the first and second continuous material flows with a Reynolds number greater than about 4400 and less than about 25000 to form a colloidal dispersion; and
   moving a continuous flow of the colloidal dispersion in a direction downstream of the combined first and second continuous material flows,
   wherein the abrasive particle composition has a pH above or below the isoelectric potential of the colloidal dispersion,
   wherein combining the first and second material flows comprises moving the first and second continuous material flows through at least one static mixer and said combining increases or decreases the pH through the isoelectric potential of the colloidal dispersion, and
   wherein the colloidal dispersion comprises the diluent, the base, the acid, and abrasive particles from the abrasive particle composition and the colloidal dispersion is substantially free of a microgel.

2. The method of claim 1, wherein the concentration of particles in the abrasive particle composition in the second continuous material flow is about 15 percent to about 35 percent by weight.

3. The method of claim 1, wherein the concentration of abrasive particles in the colloidal dispersion is less than about 5 percent by weight.

4. The method of claim 1, wherein the diluent comprises deionized water.

5. The method of claim 1, wherein the acid comprises an organic acid.

6. The method of claim 1, wherein the acid comprises one or more of the following: carboxylic acid, malonic acid, and hydrochloric acid.

7. The method of claim 1, wherein the base comprises one or more of the following: potassium hydroxide, ammonium hydroxide, and quaternary ammonium.

8. The method of claim 1, wherein the continuous colloidal dispersion has a pH of between about 8 to about 12.

9. The method of claim 1, wherein the colloidal dispersion further comprises one or more of the following: a corrosion inhibitor, an oxidizer, and a surfactant.

10. The method of claim 9, wherein the colloidal dispersion further comprises hydrogen peroxide.

11. The method of claim 1, wherein the abrasive particle composition comprises one or more of the following: silica, ceria, and alumina.

12. The method of claim 1, wherein the abrasive particle composition is a colloidal silica aqueous composition.

13. The method of claim 1, wherein providing a first continuous material flow comprises adding a base solution having a base concentration of at least about 15% by weight to a continuous flow comprising a diluent.

14. The method of claim 13, wherein the continuous flow of colloidal dispersion moving downstream has a concentration of the base of less than about 10% by weight.

15. The method of claim 14, wherein the continuous flow of colloidal dispersion moving downstream has a concentration of the base of less than about 1% by weight.

16. The method of claim 1, wherein providing the first continuous material flow comprises adding an acid solution having an acid concentration of at least about 15% by weight to a continuous flow comprising a diluent.

17. The method of claim 16, wherein the continuous flow of colloidal dispersion moving downstream has a concentration of the acid of less than about 10% by weight.

18. The method of claim 17, wherein the continuous flow of colloidal dispersion moving downstream has a concentration of the acid of less than about 1% by weight.

19. The method of claim 1, wherein the Reynolds number for combining the first and second continuous material flows is about 7400 to about 25000.

20. The method of claim 1, wherein the concentration of the acid in the first continuous material flow is less than about 10% by weight.

21. The method of claim 1, wherein the concentration of the base in the first continuous material flow is less than about 10% by weight.

22. The method of claim 1, wherein providing the first continuous material flow comprises diluting a continuous flow of the base or the acid upstream of the combined first and second continuous material flow.

23. The method of claim 1, wherein providing the second continuous material flow comprises diluting the abrasive particle composition upstream of the combined first and second continuous material flows.

24. A method of forming a colloidal dispersion, the method comprising:
providing a first continuous material flow comprising a diluent, an acid, and a base;
providing a second continuous material flow comprising an abrasive particle composition; and
forming a colloidal dispersion based at least in part on combining the first and second continuous material flows with a Reynolds number greater than about 4400 and less than about 25000,
wherein the colloidal dispersion comprises the diluent, the base, the acid, and the abrasive particles, the colloidal dispersion is substantially free of a microgel, the second continuous material feed has a pH above or below the isoelectric potential of the colloidal dispersion, and the combining the first and second continuous material flows comprises moving the first and second continuous material flows through at least one static mixer and the combination of the first and second continuous material flows increases or decreases the pH of the second material flow through the isoelectric potential of the colloidal dispersion.

25. The method of claim 24, wherein the isoelectric potential of the colloidal dispersion is at a pH of about 4.

26. The method of claim 25, wherein the second continuous material flow has a pH of about 7.

27. The method of claim 26, wherein the combined first and second continuous material flows has a pH of less than 3.

28. The method of claim 27, wherein the colloidal dispersion has a pH of about 8 to about 12.

29. The method of claim 24, further comprising providing a third continuous material flow comprising one or more of a diluent, an acid, and a base, wherein forming the colloidal dispersion is based at least in part on combining the third material flow with the combined first and second material flows with a Reynolds number greater than about 4400 and less than about 25000.

30. The method of claim 29, wherein the combination of the third continuous material flow and the combined first and second continuous material flows increases or decreases the pH of the combined first and second continuous material flows through the isoelectric potential of the colloidal dispersion.

* * * * *

UNITED STATES PATENT AND TRADEMARK OFFICE
CERTIFICATE OF CORRECTION

Page 1 of 1

PATENT NO. : 9,556,371 B2
APPLICATION NO. : 13/618088
DATED : January 31, 2017
INVENTOR(S) : Saeed H. Mohseni, Elizabeth K. Gramm and Deepak Mahulikar It is certified that error appears in the above-identified patent and that said Letters Patent is hereby corrected as shown below:

In the Claims

<u>Column 14</u>
Line 52, in Claim 1, after "second" insert -- continuous --

Signed and Sealed this
Twenty-eighth Day of March, 2017

Michelle K. Lee
*Director of the United States Patent and Trademark Office*